(12) United States Patent
Malcolm

(10) Patent No.: US 12,291,139 B2
(45) Date of Patent: May 6, 2025

(54) BARREL TIE-DOWN BRACKET

(71) Applicant: Roger J. Malcolm, San Clemente, CA (US)

(72) Inventor: Roger J. Malcolm, San Clemente, CA (US)

(73) Assignee: Roger J. Malcolm, San Clemente, CA (US)

( * ) Notice: Subject to any disclaimer, the term of this patent is extended or adjusted under 35 U.S.C. 154(b) by 1090 days.

(21) Appl. No.: 17/115,704

(22) Filed: Dec. 8, 2020

(65) Prior Publication Data

US 2021/0086686 A1 Mar. 25, 2021

Related U.S. Application Data

(63) Continuation-in-part of application No. 16/104,640, filed on Aug. 17, 2018, now Pat. No. 10,857,931, which is a continuation-in-part of application No. 29/589,385, filed on Dec. 30, 2016, now Pat. No. Des. 873,647.

(51) Int. Cl.
*B60P 7/08* (2006.01)
*B60P 7/12* (2006.01)

(52) U.S. Cl.
CPC .............. *B60P 7/12* (2013.01); *B60P 7/0807* (2013.01)

(58) Field of Classification Search
CPC .......... B60P 7/12; B60P 7/0807; B60P 3/035; B60P 7/0823; B61D 45/003; Y10T 24/29
USPC ..... 410/31–36, 39–42, 47–49, 97, 100, 120, 410/155; 108/57.13
See application file for complete search history.

(56) References Cited

U.S. PATENT DOCUMENTS

| | | | | | |
|---|---|---|---|---|---|
| 2,611,495 | A | * | 9/1952 | Weaver | B65D 71/70 410/49 |
| 5,123,547 | A | * | 6/1992 | Koch | F16L 3/2235 211/60.1 |
| 5,267,648 | A | * | 12/1993 | Baker | B65D 61/00 206/446 |
| 8,322,957 | B1 | * | 12/2012 | Pennisi | B60P 7/12 410/96 |
| 8,376,676 | B2 | * | 2/2013 | Wiebe | B60P 7/0823 410/35 |
| 10,857,931 | B1 | * | 12/2020 | Malcolm | B60P 7/12 |
| 2012/0177458 | A1 | * | 7/2012 | Johnson | B60P 7/135 410/96 |

* cited by examiner

*Primary Examiner* — Stephen T Gordon
(74) *Attorney, Agent, or Firm* — Charmasson, Buchaca & Leach, LLP

(57) ABSTRACT

A bracket for securing a container or an array of co-planarly adjacent containers, such as cylindrical barrels or oil drums to a transport vehicle. Each bracket can include a generally ring-shaped circular, planar body having a diameter sized to substantially match the outer diameter of the circular end of the barrel. Six movable couplings can extend radially outwardly from the peripheral sidewall of the bracket body at angularly spaced apart, but adjustable locations. The axial positions of the couplings can be reciprocatingly staggered so that couplings extending from adjacent brackets can overlap and interconnect to one another, thereby conjoining the brackets across the array. Hooked cables can secure the vehicle to the couplings.

9 Claims, 17 Drawing Sheets

BARREL TIE-DOWN BRACKET

PRIOR APPLICATION

This application is a continuation-in-part of U.S. patent application Ser. No. 16/104,640, filed 2018 Aug. 17, which is a continuation-in-part of U.S. patent application Ser. No. 29/589,385, filed 2016 Dec. 30, both of which are incorporated herein by reference.

FIELD OF THE INVENTION

This invention relates to cargo mounting structures and more particularly to secure mounting of uniform containers such as oil drums.

BACKGROUND

Transport of liquid commodities such as lubricating oil, and chemicals involves the use of standardized containers such as cylindrical barrels or drums. These containers must often be carried on the flat bed of vehicles such as trucks, trailers, locomotives, or water vessels during transport. Such transportation can often involve unexpected jostling which can dislodge the containers leading to costly and potentially environmentally damaging spills. Securing individual containers to the vehicles can be costly, time-consuming and involve special expertise.

Many containers are manufactured in an often imprecise inaccurate manner resulting in disuniformities in container shapes and sizes. In addition, the use of slightly damaged or otherwise misshapen containers is often required. Inaccuracies in the compact loading of plural containers can result in the often difficult task of securing those containers for transport.

Therefore, there is a need for an inexpensive way to secure arrays of similarly shaped containers for transport which addresses some or all of the above identified inadequacies.

SUMMARY

The principal and secondary objects of the invention are to provide improved transport of containers. These and other objects are achieved by providing a dedicated bracket for each container to releasably secure it to its neighboring containers and to the vehicle transporting the containers.

In some embodiments the shape of the bracket can be described as generally ring-shaped having a circular planar body having a diameter sized to substantially match the outer diameter of the circular end of a cylindrical barrel such as a standard 60 gallon oil drum which is about 57.2 centimeters (22.5 inches). In some embodiments the bracket can include a cylindrical sidewall which extends downwardly from the outer circular peripheral edge of the body to both stiffen and strengthen the body, and to discourage radial migration off of the barrel end.

In some embodiments six couplings extend radially outwardly from the sidewall at angularly evenly spaced apart locations. In some embodiments the axial positions of the couplings are reciprocatingly staggered so that a first set of three couplings angularly spaced apart 120 degrees are located at a first upper axial position while a second set of three couplings spaced apart 120 degrees, and angularly offset 60 degrees from the first set of coupling, are located at a second lower axial position. In some embodiments the couplings extending from adjacent brackets can overlap one another, bringing their respective loop apertures in alignment so they can be engaged by a retaining pin, while the top surface of the adjacent brackets remain substantially co-planar.

In some embodiments there is provided a device for securing a pair of containers having a uniform geometry to one another, said device comprises: first and second brackets; wherein each of said brackets comprises: a body portion shaped and dimensioned to intimately and releasably nest over a section of said uniform geometry; a plural number of couplings located at spaced apart locations on the periphery of said bracket; wherein one of a first set of said couplings on said first bracket is shaped and dimensioned to interconnect with a co-oriented one of a second set of said couplings on said second bracket.

In some embodiments said section of said uniform geometry is co-planar when said pair of containers is arranged in a co-planarly adjacent manner.

In some embodiments said section of said uniform geometry is a circular top end of said container.

In some embodiments said plural number is six.

In some embodiments said body portion has a substantially L-shaped cross-sectional geometry.

In some embodiments said one of a first set of said couplings on said first bracket is an upper coupling axially spaced apart from said one of a second set of said couplings on said second bracket wherein said one of a second set of said couplings is a lower coupling.

In some embodiments said upper coupling is axially located to overlap said lower coupling when said first and second brackets are coplanarly adjacent.

In some embodiments said upper coupling is shaped to have an axial upper aperture, and said lower coupling is shaped to have an axial lower aperture; and wherein said upper aperture and said lower aperture can be engaged by a fastener restricting radial movement between said first and second brackets when said first and second brackets are coplanarly adjacent.

In some embodiments said fastener is selected from the group consisting of: threaded bolts, clamps, clips, corkscrew pins, padlocks and rivets.

In some embodiments a first uppermost surface of said first bracket is coplanar with a second uppermost surface of said second bracket.

In some embodiments there is provided that in a system for securing a plurality of containers having a uniform geometry to the flat bed of a vehicle using a plurality of brackets, wherein each of said brackets secures to a section of at least one of said containers and a plurality of cables anchor said brackets to said vehicle, an improvement which comprises each of said brackets comprising: a body portion shaped and dimensioned to intimately engage a portion of said uniform geometry; and, a plural number of couplings shaped and dimensioned to interconnectedly conjoin a substantially co-planarly adjacent pair of said brackets.

In some embodiments there is provided a device for securing an array of containers to one another, each of said containers having a uniform geometry, said device comprises: first and second brackets; wherein each of said brackets comprises: a body portion shaped and dimensioned to intimately and releasably nest over a section of said uniform geometry of a finite number of said containers arranged in a co-planarly adjacent arrangement; a plural number of couplings located at spaced apart locations on the periphery of said bracket; wherein one of a first set of said couplings on said first bracket is shaped and dimensioned to interconnect with a co-oriented one of a second set of said couplings on said second bracket.

In some embodiments there is provided that in a system for securing a plurality of containers to the flatbed of a vehicle using a plurality of brackets, wherein each of said containers has a section having a co-planarly similar geometry, and wherein each of said brackets secures to the top geometry of a finite number of said containers arranged in a co-adjacent, co-planar arrangement and a plurality of cables anchor said brackets to said vehicle, an improvement which comprises each of said brackets comprising: a body portion shaped and dimensioned to intimately engage said top geometry; a plural number of couplings shaped and dimensioned to interconnectedly conjoin a substantially coplanarly adjacent pair of said brackets.

In some embodiments there is provided a device for securing a pair of containers having a substantially uniform geometry to one another, said device comprises: first and second brackets; wherein each of said brackets comprises: a body portion shaped and dimensioned to intimately and releasably nest over a section of said uniform geometry; a plural number of couplings located at spaced apart locations on the periphery of said bracket; wherein one of a first set of said couplings on said first bracket is shaped and dimensioned to interconnect with a co-oriented one of a second set of said couplings on said second bracket.

In some embodiments said plural number of couplings are movably secured to said body portion.

In some embodiments said plural number of couplings detachable from said body portion.

In some embodiments at least one of said plural number of couplings comprises: a plate having a distal aperture; a hook connected to said plate; wherein said is shaped and dimensioned to releasably engage said body portion.

In some embodiments said body portion comprises a plurality of angularly spaced apart seats, wherein each of said seats forms a discrete mounting location for one of said plural number of couplings.

In some embodiments each of said seats comprises a notch formed on an edge of said body portion, and where said one of said plural number of couplings comprises a nib oriented to engage said notch when said coupling is secured to said body portion.

In some embodiments said body portion comprises a track extending angularly along said body portion; wherein a first one of said plural number of couplings comprises: a base adjustably mounted to said track.

In some embodiments said track extends angularly along an arcuate sidewall of said body portion.

In some embodiments said section of said uniform geometry is co-planar when said pair of containers is arranged in a co-planarly adjacent manner.

In some embodiments said section of said uniform geometry is a circular top end of said container.

In some embodiments said plural number is six.

In some embodiments said one of a first set of said couplings on said first bracket is an upper coupling axially spaced apart from said one of a second set of said couplings on said second bracket wherein said one of a second set of said couplings is a lower coupling.

In some embodiments said upper coupling is axially located to overlap said lower coupling when said first and second brackets are coplanarly adjacent.

In some embodiments said upper coupling is shaped to have an axial upper aperture, and said lower coupling is shaped to have an axial lower aperture; and wherein said upper aperture and said lower aperture can be engaged by a fastener restricting radial movement between said first and second brackets when said first and second brackets are coplanarly adjacent.

In some embodiments there is provided that in a system for securing a plurality of containers having a substantially uniform geometry to the flat bed of a vehicle using a plurality of brackets, wherein each of said brackets secures to a section of at least one of said containers and a plurality of cables anchor said brackets to said vehicle, an improvement which comprises each of said brackets comprising: a body portion shaped and dimensioned to intimately engage a portion of said uniform geometry; a plural number of couplings shaped and dimensioned to interconnectedly conjoin a substantially co-planarly adjacent pair of said brackets, and, wherein at least one of said couplings is movable with respect to said body portion.

In some embodiments there is provided a device for securing an array of containers to one another, each of said containers having a uniform geometry, said device comprises: first and second brackets; wherein each of said brackets comprises: a body portion shaped and dimensioned to intimately and releasably nest over a section of said uniform geometry of a finite number of said containers arranged in a co-planarly adjacent arrangement; a plural number of couplings located at spaced apart locations on the periphery of said bracket; wherein one of a first set of said couplings on said first bracket is shaped and dimensioned to interconnect with a co-oriented one of a second set of said couplings on said second bracket; and, wherein said one of a first set of said couplings on said first bracket is moveable with respect to said first bracket.

The original text of the original claims is incorporated herein by reference as describing features in some embodiments.

DESCRIPTION OF THE EXEMPLARY EMBODIMENTS

Figure 1:
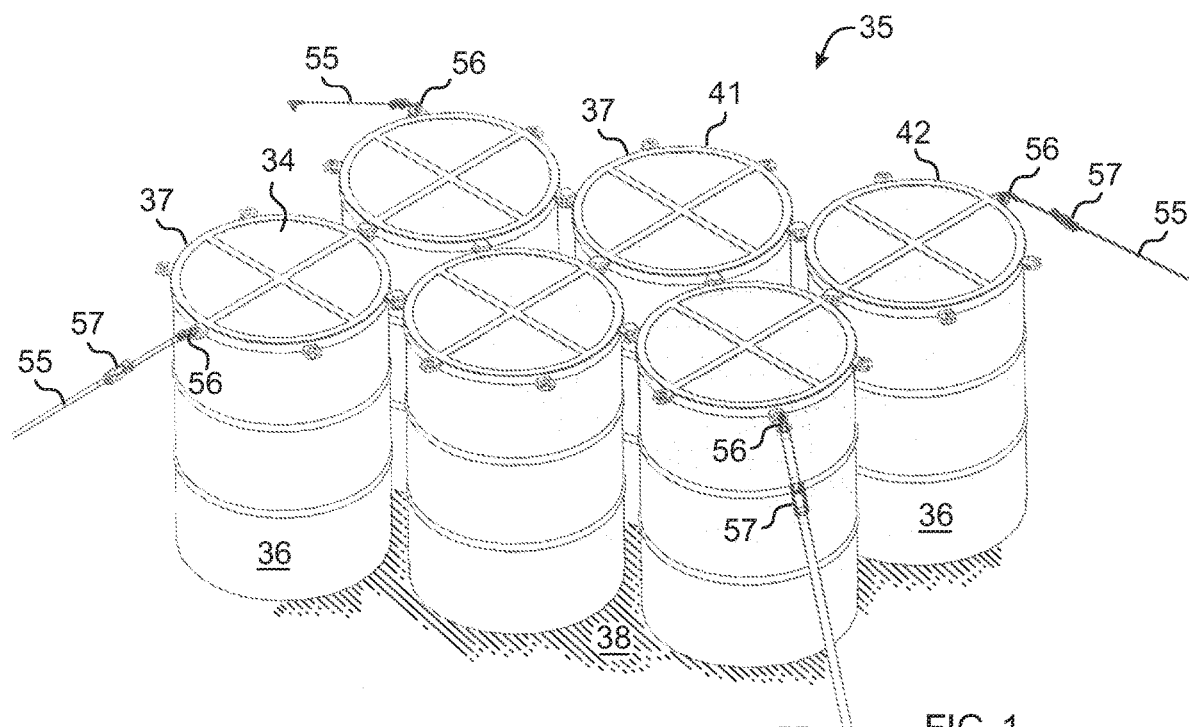
FIG. 1 is a diagrammatic perspective view of a group of conjoined barrel tie-down brackets securing the same number of barrels to the bed of a flat bed truck.

In this specification, the references to top, bottom, upward, downward, upper, lower, vertical, horizontal, sideways, lateral, back, front, proximal, distal, near, far, etc. can be used to provide a clear frame of reference for the various structures with respect to other structures while the bracket is in its horizontal orientation as shown in FIG. 1, and not treated as absolutes when the frame of reference is changed, such as when the device is oriented sideways, or at an angle.

The term "substantially" can be used in this specification because manufacturing imprecision and inaccuracies, and damage can lead to non-symmetricity and other inexactitudes in the physical characteristics, shape, dimensioning and orientation of various structures. Further, use of "substantially" in connection with certain geometrical shapes, such as "quadrangular", "cylindrical", "conical", and "circular", physical characteristics, such as "transparent", and orientations, such as "axial", "parallel" and "perpendicular", can be given as a guide to generally describe the function of various structures, and to allow for slight departures from exact mathematical geometrical shapes, physical characteristics, and orientations, while providing adequately similar function. Those skilled in the art will readily appreciate the degree to which a departure can be made from the mathematically exact geometrical references or descriptions. Those skilled in the art will readily appreciate which features of individual embodiments can be applicable and incorporated into the features of other embodiments.

Figure 2:
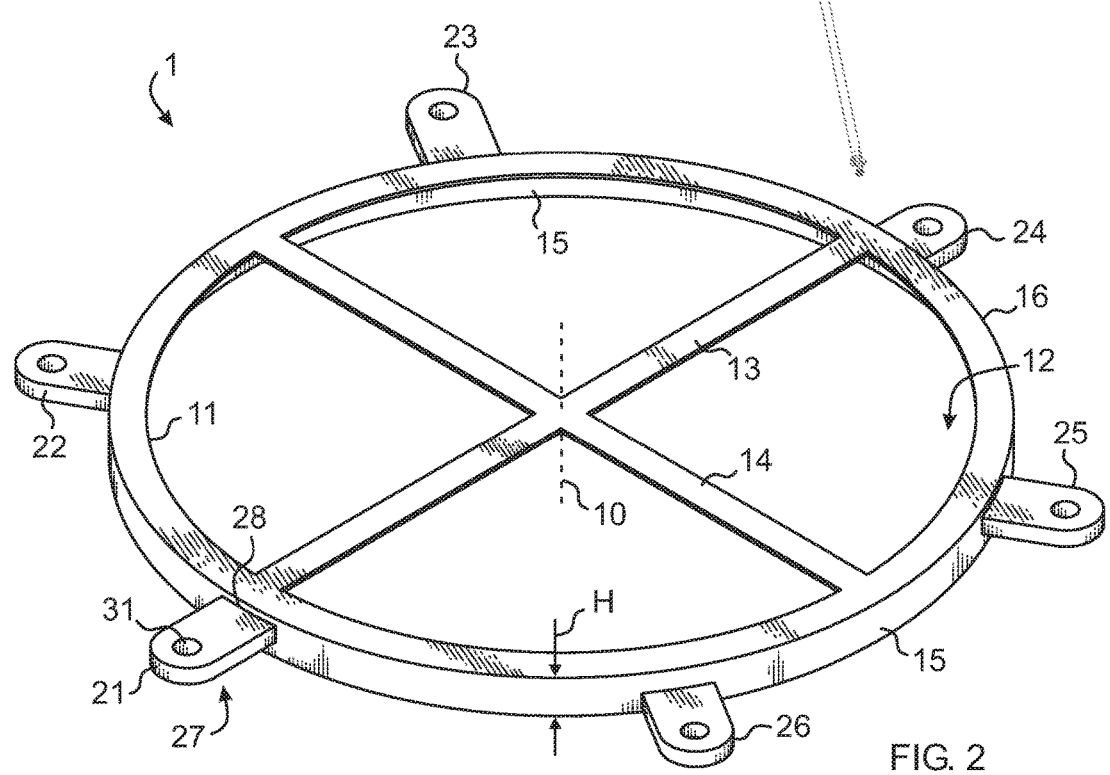
FIG. 2 is a diagrammatic perspective view of a barrel tie-down bracket according to an exemplary embodiment of the invention.

Referring now to the drawing, there is shown in FIGS. 1-2, an embodiment of a bracket 1 which includes a substantially flat, circular, ring-shaped body 11 having a central axis 10 and a pair of mutually orthogonal diametric crosspieces 13,14 spanning the center hole 12 of the body to stiffen and strengthen the body. The bracket has a cylindrical sidewall 15 having a substantially uniform height H which extends downwardly from the outer circular peripheral edge 16 of the body. The body 11 and inner diameter of the sidewall 15 can have a diameter sized to allow the bracket to intimately nest over the outer diameter of the circular end 34 of a cylindrical barrel 36 such as a standard 60 gallon oil drum which is about 57.2 centimeters (22.5 inches). A purpose of the sidewall is to both stiffen and strengthen the body, and to discourage radial migration of the bracket off of the barrel. The bracket can be from a durable, rigid, strong material such as steel or plastic.

Figure 8:
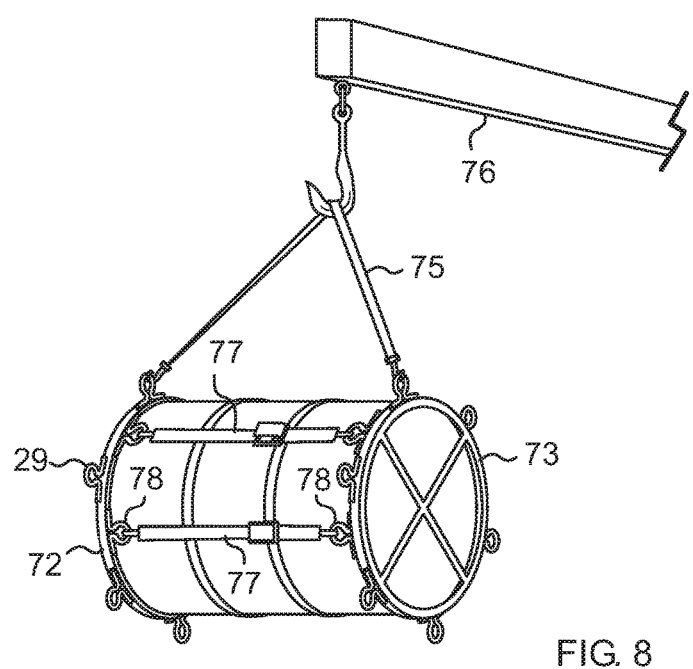
FIG. 8 is a diagrammatic perspective view of a barrel engaged by a pair of brackets at both ends being lifted by a hoist.

Six couplings 21-26 extend radially outwardly from the sidewall 15 at angularly evenly spaced apart locations. Thus, the angular spacing can be about 60 degrees between adjacent couplings. Each coupling can be formed by a D-shaped tab 27 having a medial cylindrical aperture 31 and having a flattened side base 28 connected to the sidewall. Alternately, as shown in FIG. 8, each coupling can be formed by a loop 29 of oblong bar material and shaped to have a substantially Greek letter omega shape where the open feet are connected to the sidewall.

The axial positions of the couplings 21-26 are reciprocatingly staggered so that a first set of three couplings 21,23,25 mutually uniformly angularly spaced apart by about 120 degrees are located at a first upper axial position while a second set of three couplings 22,24,26 mutually uniformly angularly spaced apart by about 120 degrees, and angularly offset from the first set by about 60 degrees, are located at a second lower axial position. In this way, a pair of brackets can be secured upon a pair of co-planarly adjacent barrels by engaging similar sections of their uniform geometry, namely their circular ends. The couplings extending from coplanarly adjacent brackets can overlap one another, bringing their respective apertures 31 in alignment so they can be engaged by a retaining pin, while the top surface of the adjacent brackets remain substantially coplanar.

As shown in FIG. 1, by locating the six couplings at 60 degree intervals around the outer circumference of the sidewall, an array 35 of barrels 36 each having its own dedicated bracket 37 can be loaded for transport on the supporting bed surface 38 of a vehicle in the most compact triangular or hexagonal packing manner. By tying the array together, it is far less likely that any barrel will be dislodged. However, the bracketed barrels can also be further secured upon the support surface 38 by attaching one or more tie-down cables 55 to the vehicle. Each adjustable tie-down cable includes an ratcheting adjustment device 57 and a hook 56 dimensioned to releasably engage the aperture of a free coupling.

Figure 3:
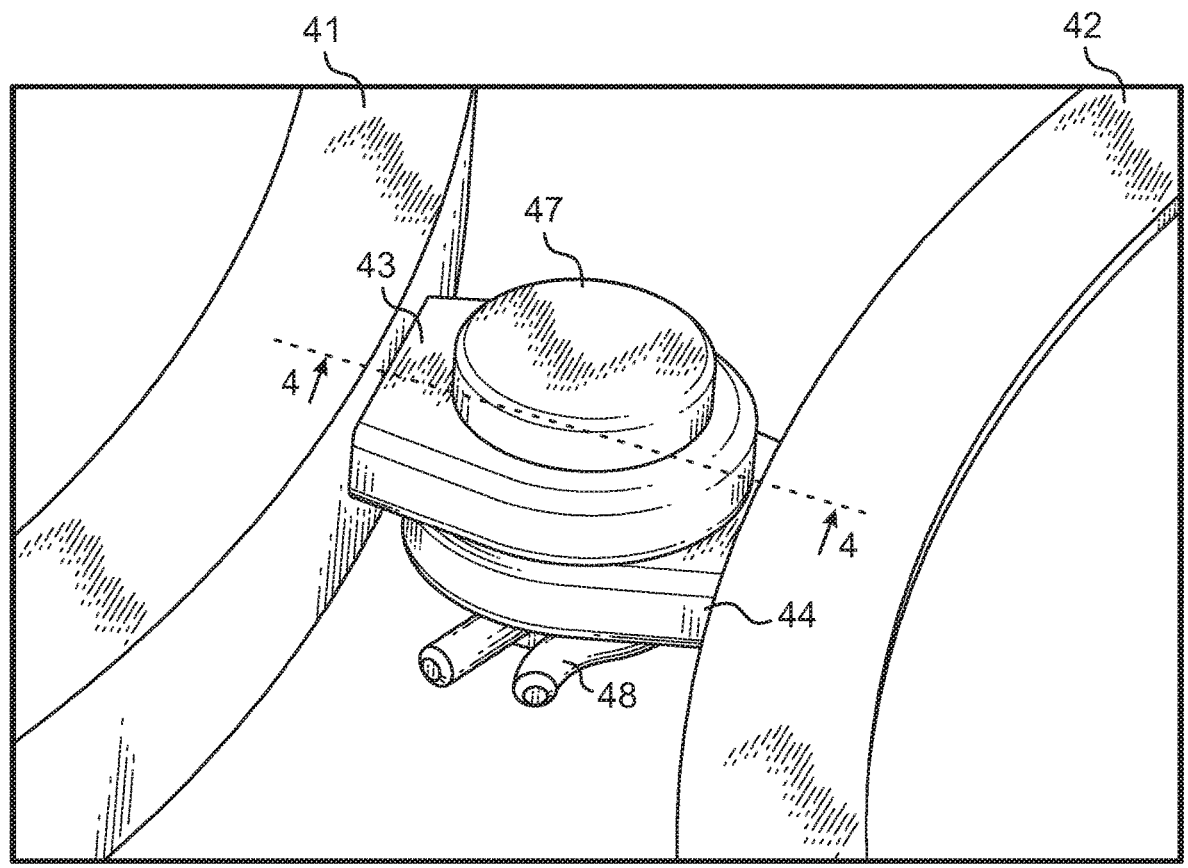
FIG. 3 is a diagrammatic partial perspective view of a pair of adjacent barrel tie-down brackets conjoined by a fastening pin engaging the holes of overlapping peripheral couplings.
Figure 4:
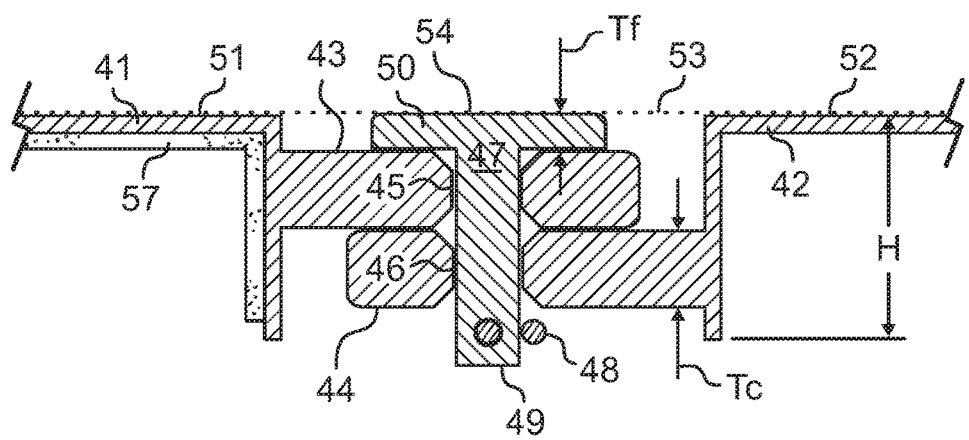
FIG. 4 is a diagrammatic partial cross-sectional side view of an interconnected pair of bracket couplings of FIG. 3 taken along line 4-4.

Referring now to FIGS. 3 and 4, a pair of co-planarly adjacent brackets 41,42 are angularly oriented to allow one of their respecting couplings 43,44 to overlap so that the couplings can be interconnected and the two brackets can be conjoined. Overlapping couplings having co-aligned apertures 45,46 can be secured to one another by a fastener such as a headed retaining pin 47 including an axial post 49 sized to intimately engage both apertures. The pin restricts radial movement between conjoined brackets. The pin can be held axially in place by a clip such as a cotter pin 48 engaging the end of the post opposite the head 50. Alternately, other fasteners, both releaseable and non-releaseable, such as threaded bolts, clamps, clips, corkscrew pins, padlocks, rivets or the like can be used. Although the preferred exemplary embodiment describes a bracket system which is intended to be reusable, the disclosed bracket system can be made from disposable or recycleable plastic, conjoined with permanent fasteners, and removed from the array of barrels or other containers while conjoined or by cutting some or all of the interconnected couplings. This view also shows that each bracket 41,42 can have a substantially L-shaped cross-sectional geometry.

The axially staggered couplings 43,44 allow the adjacent brackets 41,42 to have upper surfaces 51,52 which are coplanar, falling substantially within the same plane 53. The dimensioning of the head 50 of the pin 47 can be selected to allow the upper surface of the head to be coplanar as well. By keeping these surfaces coplanar, the chances of the brackets inadvertently snagging on something are minimized.

FIG. 4 also shows that the bracket can be adapted to carry one or more layers 57 of resilient material such as neoprene to more firmly secure the bracket to the barrel and accommodate minor variations in diameter due to dents or manufacturing inconsistencies. The resilient material layer also helps cushion barrels from vibration.

Figure 5:
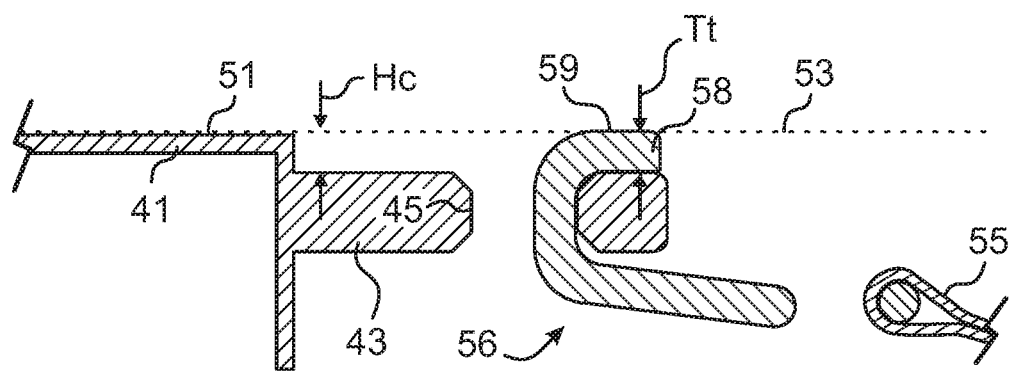
FIG. 5 is a diagrammatic partial cross-sectional side view of a bracket coupling being engaged from below by the hook of a securing cable.
Figure 6:
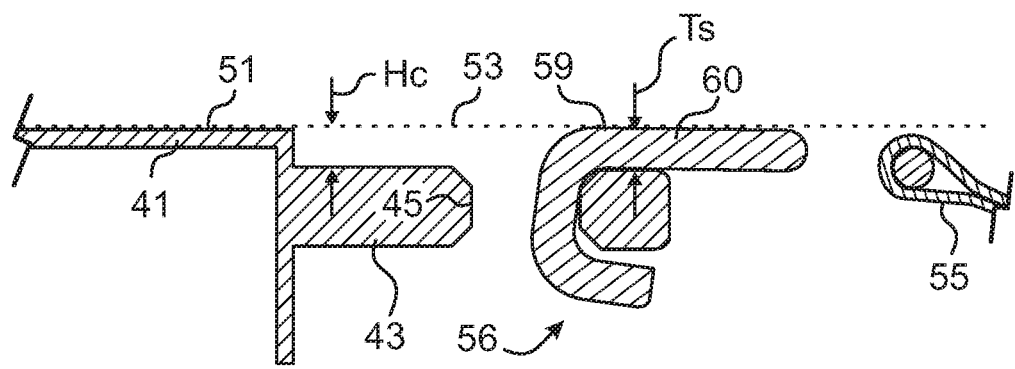
FIG. 6 is a diagrammatic partial cross-sectional side view of a bracket coupling being engaged from above by the hook of a securing cable.

Further, as shown in FIGS. 5-6 the hooks 56 of the tie-down cables 55 can be dimensioned so that no portion of the hook extends beyond the common plane 53 of the upper surfaces of joined adjacent brackets and their connecting pins regardless of whether the hook engages an axially upper or axially lower aperture of a coupling.

In FIG. 5 where the coupling 43 being engaged is one of the set of couplings in the upper axial position, the hook 56 can engage from below so that its tip portion 58 forms an upper surface 59 at or below the plane 53 formed by the upper surface 51 of the bracket 41. The hook 56 can be made to have a tip portion which has a maximum vertical dimension Tt which is less than or equal to the height He of the gap formed between the upper surface of the coupling and the upper surface of the bracket. This prevents any portion of the hook being located above the plane when engaged where it may interfere with structures above that plane.

Similarly, as shown in FIG. 6, where the coupling 43 is engaged by the hook 56 from above, the shank portion 60 can be dimensioned so that the maximum vertical dimension Ts is less than or equal to the height He of the gap between the upper surfaces of the coupling and the bracket 41. This prevents any portion of the hook being located above the common plane 53 of the adjacent bracket upper surfaces when engaged. This also allows non-interfering engagement with any of the set of axially lower couplings.

In this way the upper surface of the array presents a coplanar surface so that snags are reduced and the top of the array can support a flat platform such as a layer of plywood which in turn can support a second array stacked thereon. In this way the brackets are useful in securing many barrels in a warehouse environment.

It shall be understood that the couplings are further shaped and dimensioned to have rounded outer surfaces which help avoid their inadvertently damaging or snagging items of clothing, cables or other materials that may contact the bracket.

Figure 7:
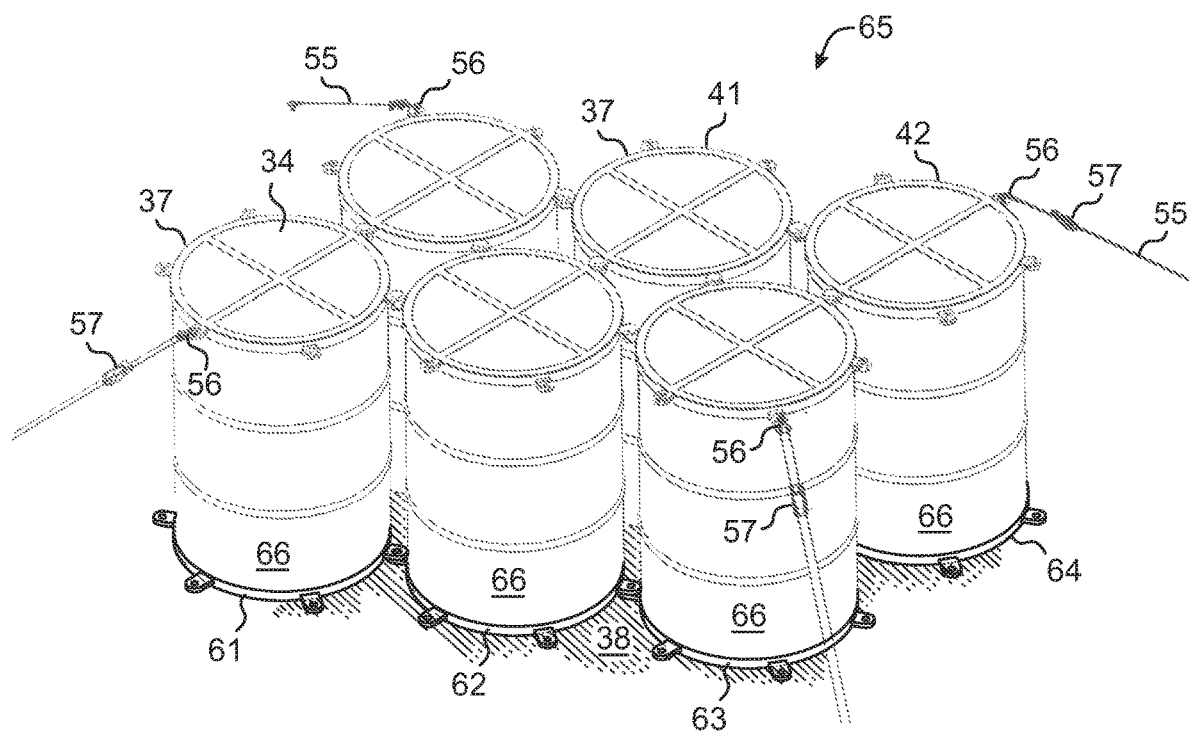
FIG. 7 is a diagrammatic perspective view of an array of co-planarly adjacent barrels arranged in a triangular packing manner on a flatbed truck engaged on their bottom ends by a second group of conjoined barrel tie-down brackets.

For an even more rugged arrangement, a second array of interconnected brackets 61,62,63,64 can be formed on the circular opposite ends of the array 65 of barrels as shown in FIG. 7.

As shown in FIG. 8 each barrel 71 can be equipped with brackets 72,73 at both ends and thereby moved individually using the attached brackets as convenient grasping points, or by using for example a cable 75 and hoist 76. The brackets can be secured to the ends of the barrel by a plurality of axial straps 77 engaging the couplings of both brackets, or other spaced apart anchorments 78 formed onto the brackets.

Figure 9:
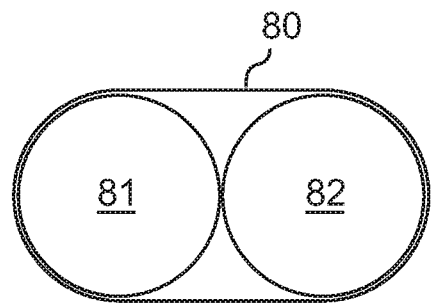
FIG. 9 is a diagrammatic top plan view of a pair of co-planarly adjacent barrels engaged by a single oval-shaped bracket.
Figure 10:
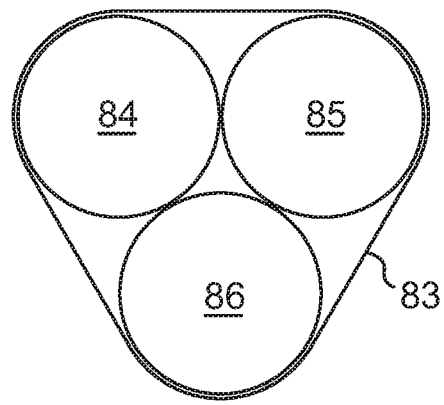
FIG. 10 is a diagrammatic top plan view of three coplanarly adjacent barrels arranged in a triangular packing manner and engaged by a single rounded equilateral triangle-shaped bracket.
Figure 11:
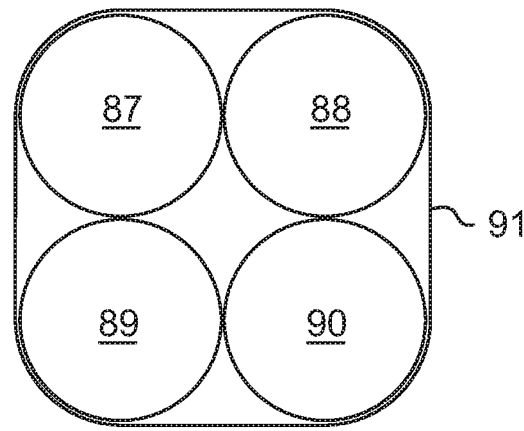
FIG. 11 is a diagrammatic top plan view of four coplanarly adjacent barrels arranged in a square-type packing manner and engaged by a single rounded-corner square-shaped bracket.

As shown in FIGS. 9-11, the bracket can be designed to be engaged by a plural number of adjacent barrels. In FIG. 9, a bracket 80 having a generally oval shape can engage the co-planarly adjacent ends of a pair of barrels 81,82. In FIG. 10, a bracket 83 having a generally rounded equilateral triangular shape engages three co-planarly adjacent barrels 84,85,86 arranged in a triangular packing manner. In FIG. 11, four co-planarly adjacent barrels 87,88,89,90 arranged in a square-type packing formation can be engaged by a bracket 91 having a generally rounded corner square shape. Even though the arrangement of barrels in the square shape takes up more space, in many operations it is preferable so that the four barrels can be carried on easily moved familiar square wooden pallets and present the same footprint regardless of orientation.

Figure 12:
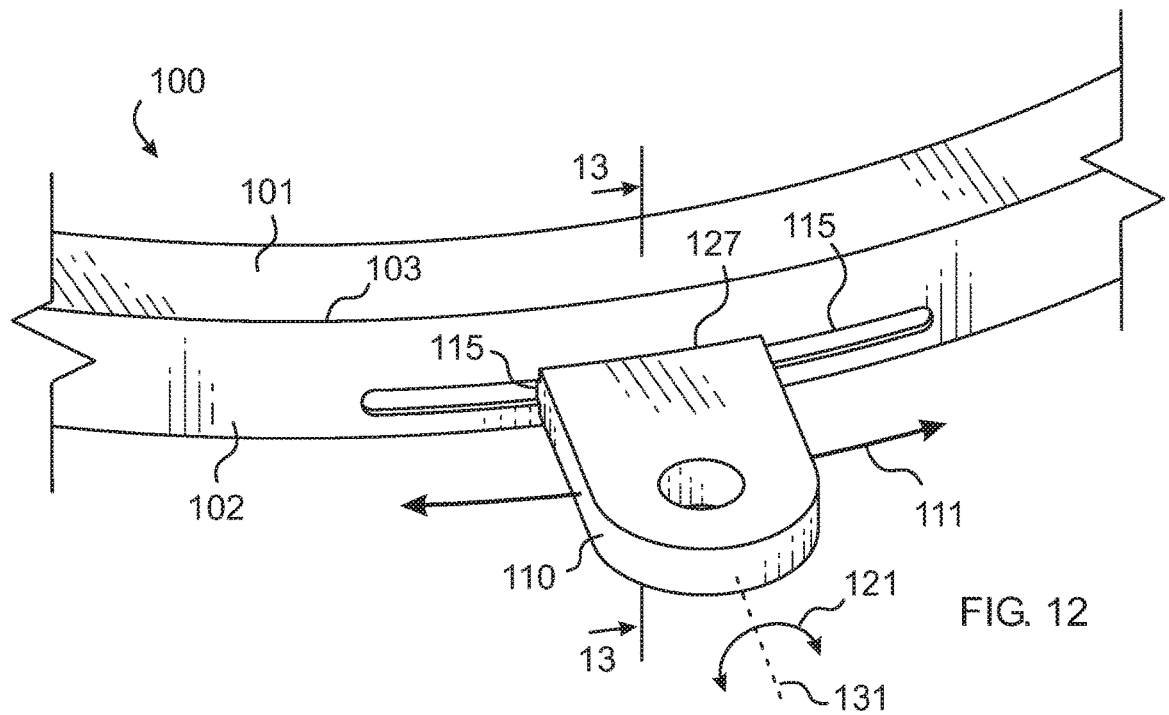
FIG. 12 is a diagrammatic partial perspective view of an alternate embodiment of a bracket having a moveable coupling.
Figure 13:
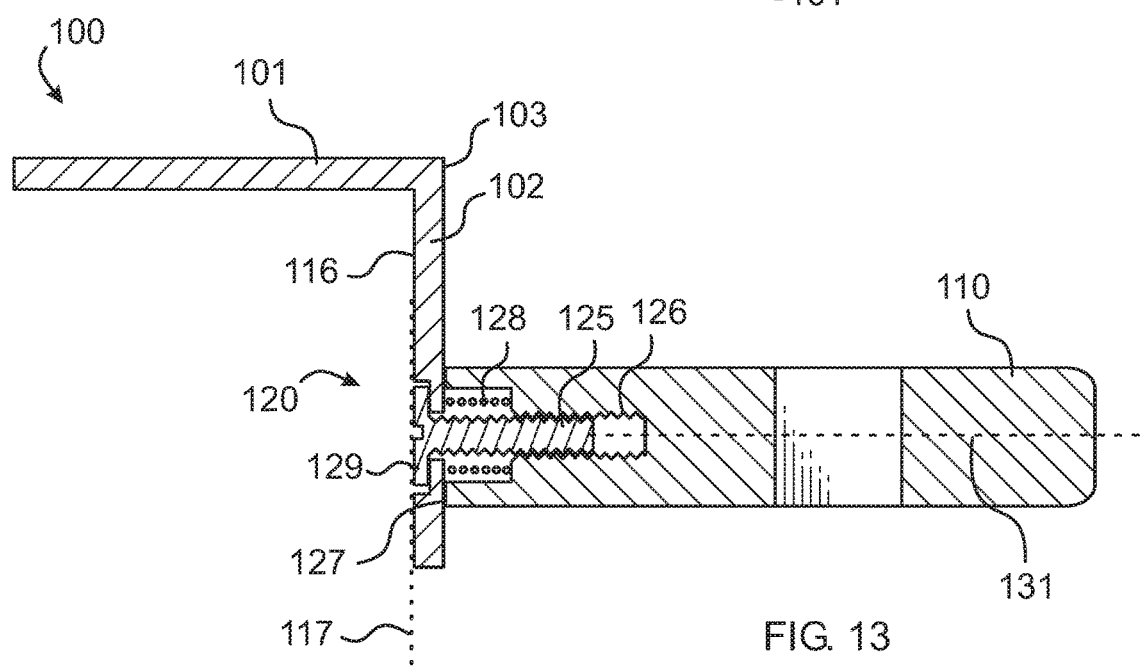
FIG. 13 is a diagrammatic partial cross-sectional side view of a bracket coupling of FIG. 12 taken along line 13-13.

FIGS. 12-13 show and alternate embodiment of a bracket 100 similar to the bracket of FIG. 2 including a substantially flat, circular, ring-shaped body 101 and a cylindrical sidewall 102 extending downwardly from the distal circular peripheral edge 103 of the body from which can extend six angularly spaced apart couplings which allow the bracket to be secured to one or more adjacent brackets. In this embodiment however, at least one of the six couplings 110 is movable 111 with respect to the sidewall. Specifically, in this embodiment, the coupling 110 can be secured to the sidewall by an adjustable fastener 120 engaging a track 115 located on the periphery of the body, allowing the coupling to be repositioned angularly to better accommodate misalignment of neighboring brackets due misshapen containers and/or loading imprecision or inaccuracy.

The track 115 can include an arcuate slot extending angularly through a medial portion of the sidewall 102 and substantially parallel to the peripheral edge 103. The fastener 120 can include an adjustable screw 125 engaging a threaded bore 126 set into the arcuate proximal face 127 at the base of the coupling. A spring 128, coaxial with the threaded shaft of the screw, can provide adjustable frictional contact between the fastener and the track and can optionally lock the coupling in position with respect to the track. It shall be noted that the fastener can be shaped and dimensioned so that the head 129 of the screw does not extend proximally beyond the inner surface 116 of the sidewall. In this way the bracket 100 can be readily fitted over the cylindrical top 117 of a barrel. It shall be noted that adjacent tracks on a bracket can be staggered axially with respect to the central axis of the cylindrical bracket so that couplings from adjacent brackets can overlap. Those skilled in the art will readily appreciate other mechanical fasteners which allow movement of the coupling.

Optionally, a tongue 121 can be formed on the arcuate proximal face 127 of the coupling 110. The tongue can prevent roll movement 130 of the coupling about an axis 131 normal to the sidewall. Alternately, by eliminating the tongue the minor roll movement of the coupling can facilitate alignment of the coupling with a coupling on a neighboring bracket.

Figure 14:
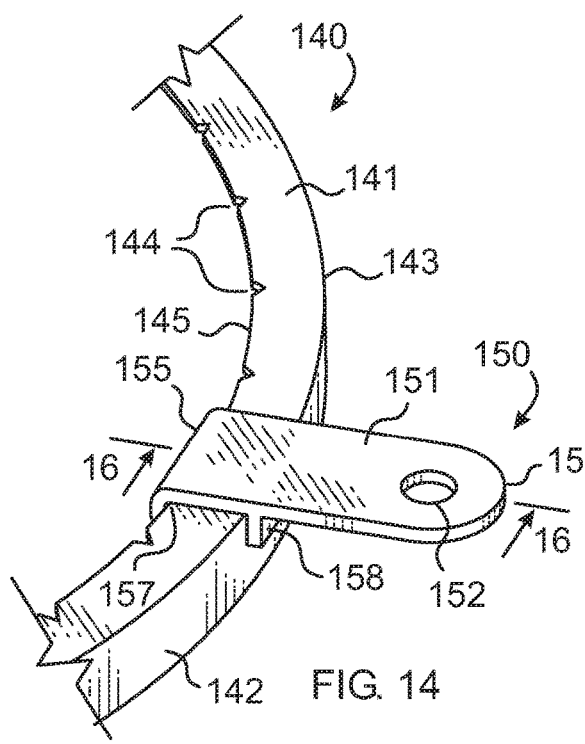
FIG. 14 is a diagrammatic partial perspective view of an alternate embodiment of a bracket having a removeable coupling.
Figure 15:
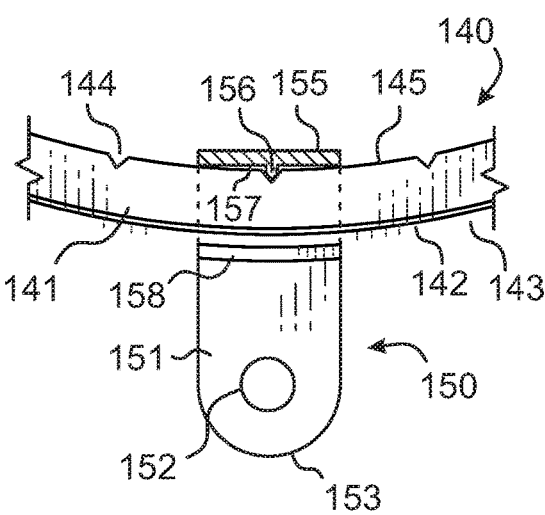
FIG. 15 is a diagrammatic partial cross-sectional, partial bottom view of the bracket FIG. 14.
Figure 16:
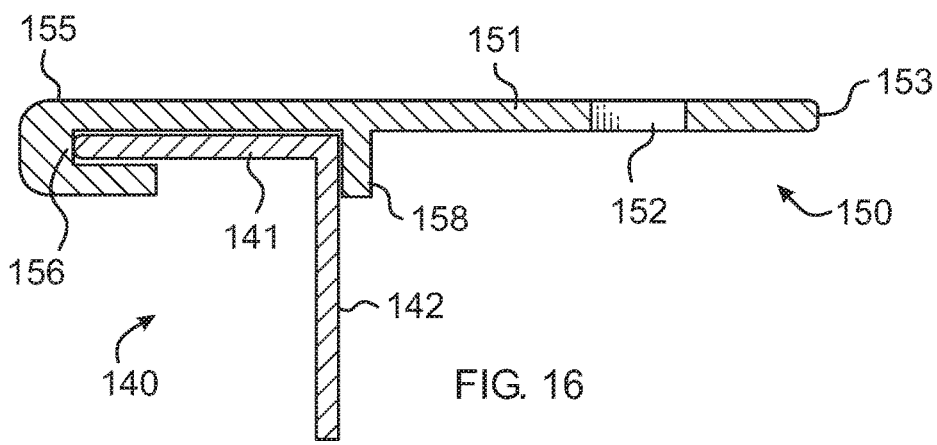
FIG. 16 is a diagrammatic cross-sectional side view of the bracket FIG. 14 taken along line 16-16.

Referring now to FIGS. 14-16 there is shown an alternate embodiment of the bracket 140 similar to the bracket of FIG. 2 including a substantially flat, circular, ring-shaped body 141 and a cylindrical sidewall 142 extending downwardly from the distal circular peripheral edge 143 of the body. A number of couplings 150 can be installed on the bracket in order to allow the bracket to be secured to one or more adjacent brackets.

Each coupling 150 can include a substantially rigid plate portion 151 having a distal end 153 including an aperture 152 extending axially with respect to the central axis of the substantially cylindrical bracket 140. The proximal end of the plate connects to a hook structure 155 adapted to wrap around and movably secure to the ring-shaped body 141 of the bracket. Indeed, the coupling can completely detach from the remainder of the bracket. The coupling can also include an arcuate stabilizing ridge 158 extending axially downwardly from the bottom of the plate. The ridge is oriented to have a concave surface nest against the convex surface of the sidewall 142 when the coupling is placed under various loads to help keep the coupling firmly secured to the body of the bracket.

Each coupling can be angularly positioned at one of a plurality of discrete angular locations determined by a series of angularly spaced-apart seats 144 formed on the bracket. This embodiment shows that the seats can be notches set into the proximal edge 145 of the ring-shaped body 141 of the bracket 140. Each coupling can include a distally projecting nib 156 formed in the crook 157 of the hook structure 155. The nib can be shaped and dimensioned to nest within the notch and thereby prevent angular movement of the coupling when so engaged. The number of discrete locations can be determined by the number of notches. In an alternate embodiment, similar notches can formed angularly abutting one another continuously around the inner periphery of the ring-shaped body to provide a maximum of discrete angular locations.

Figure 17:
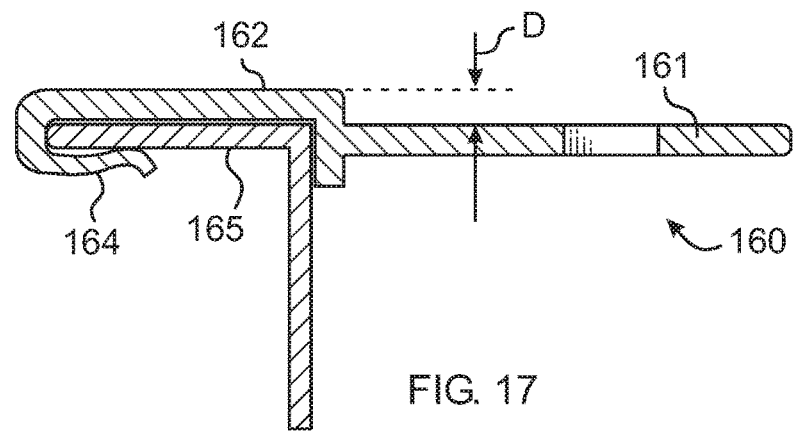
FIG. 17 is a diagrammatic cross-sectional side view of an alternate embodiment of removeable coupling having a friction clip hook structure.
Figure 18:
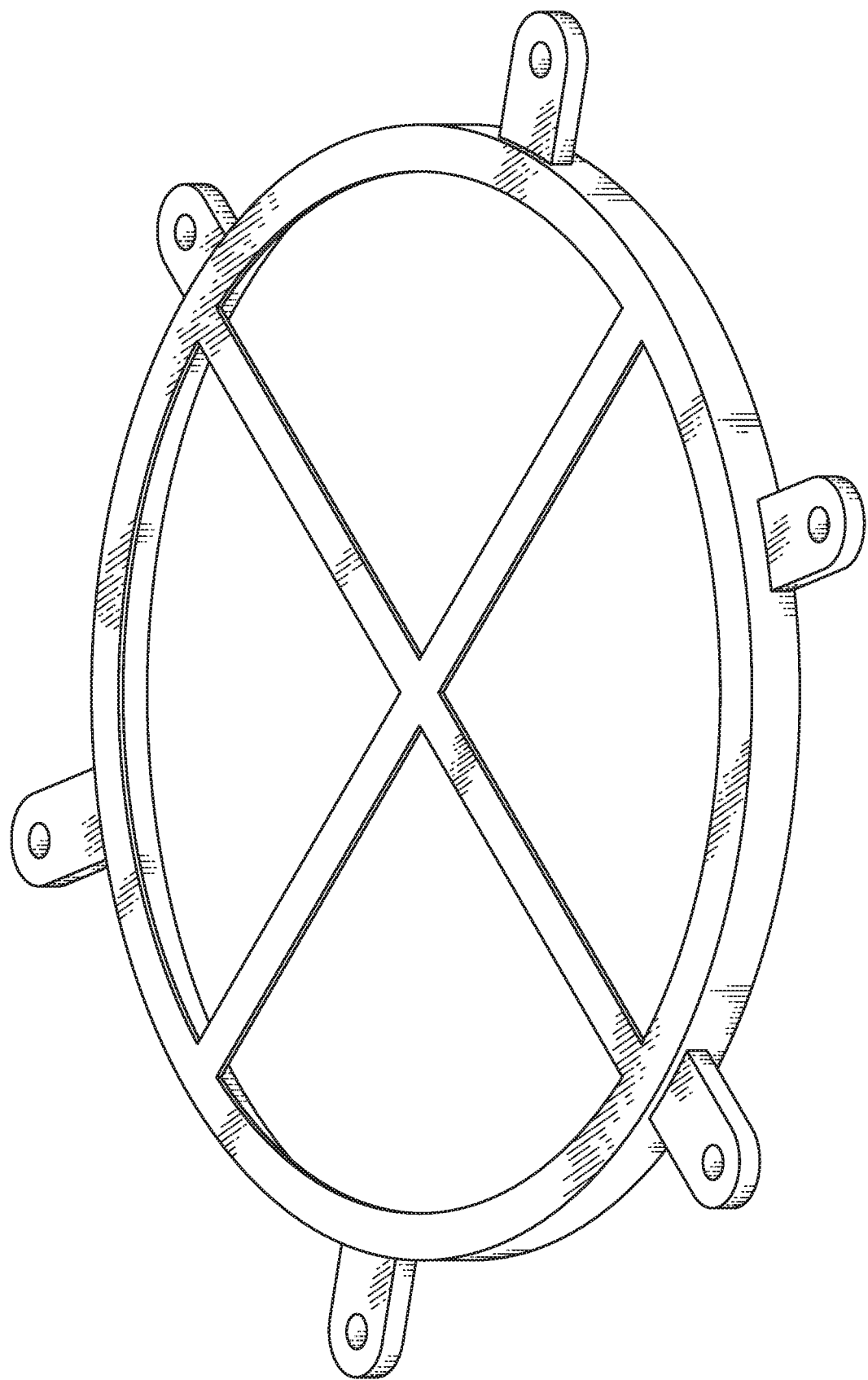
FIG. 18 is a top, front, left side perspective view of a barrel tie-down bracket of FIG. 1.
Figure 19:
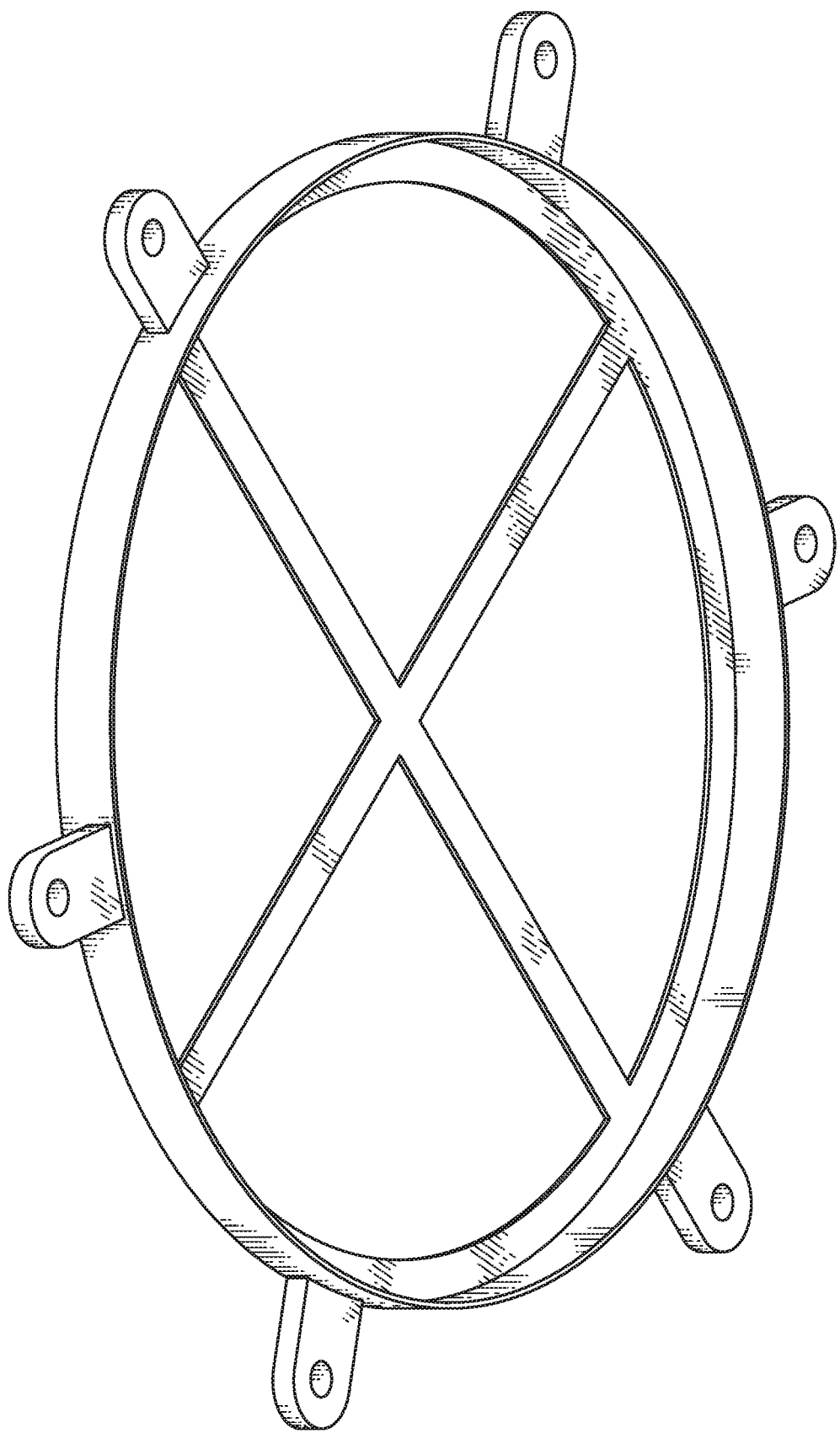
FIG. 19 is a bottom, back, right side perspective view thereof.
Figure 20:
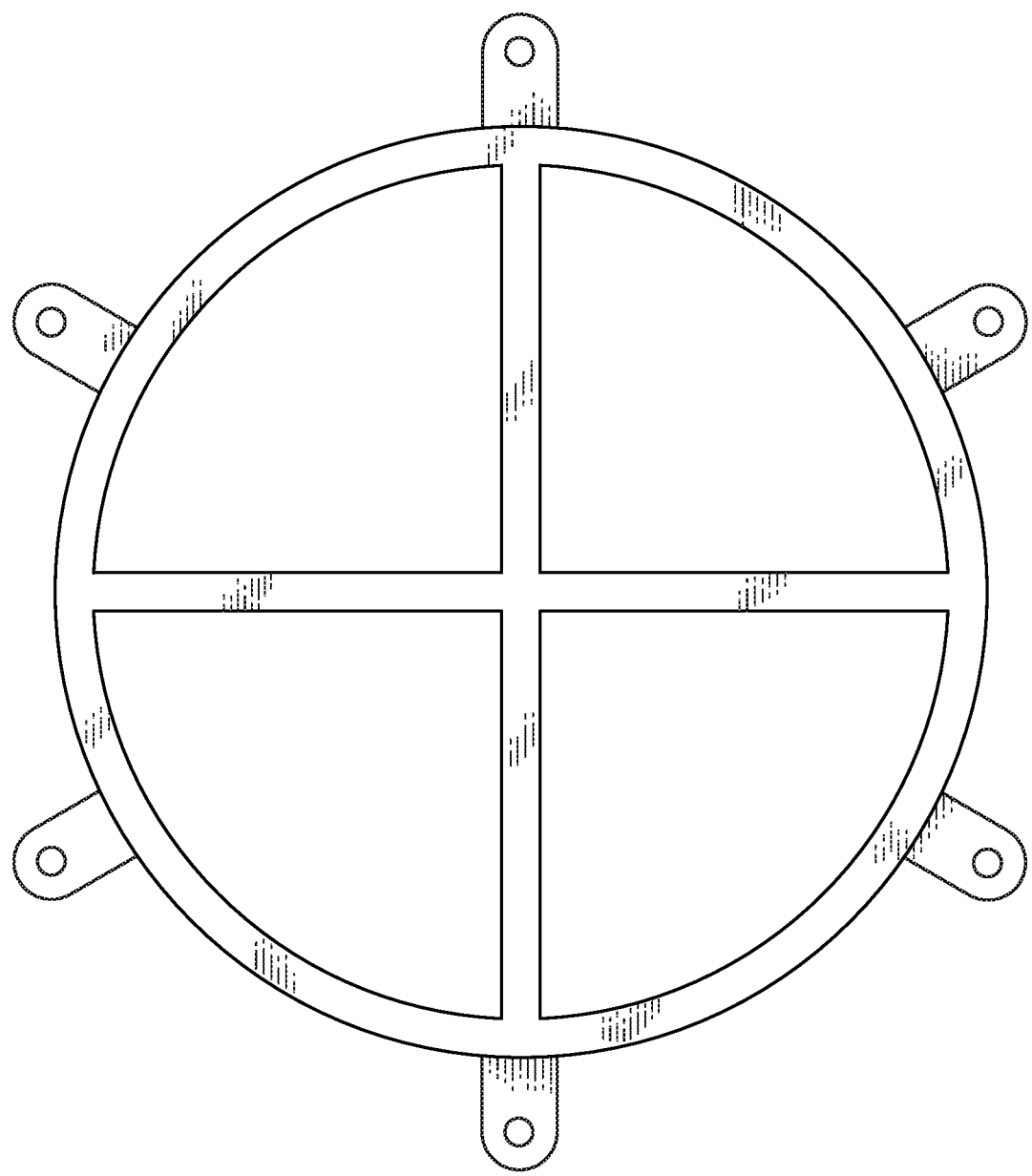
FIG. 20 is a top plan view thereof.
Figure 21:
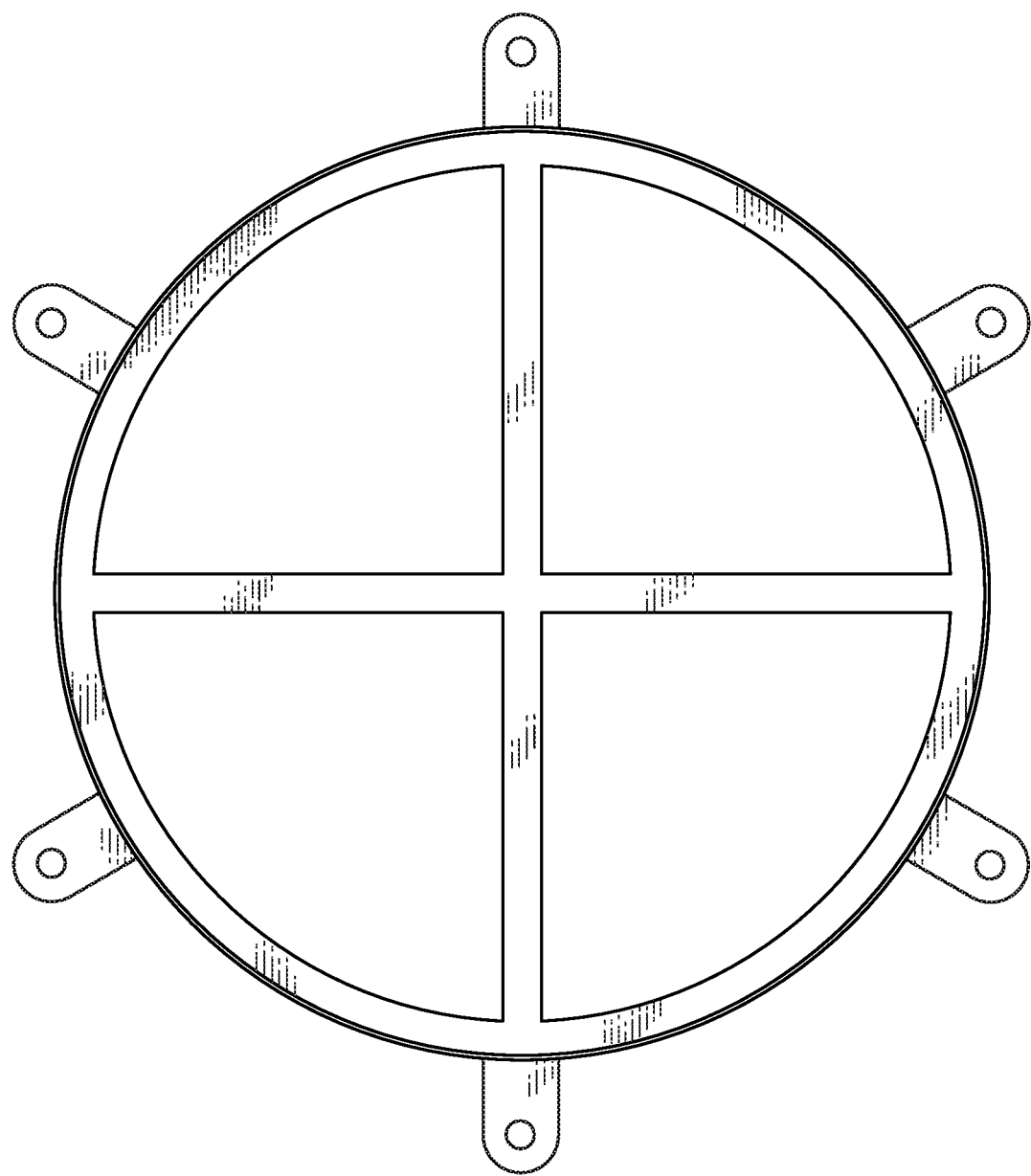
FIG. 21 is a bottom plan view thereof.
Figure 22:
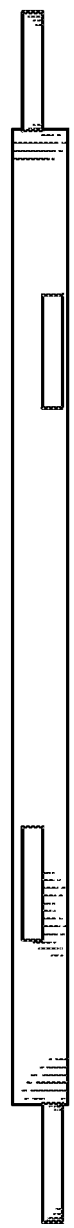
FIG. 22 is a right side plan view thereof, the left side plan view being a mirror image thereof.
Figure 23:
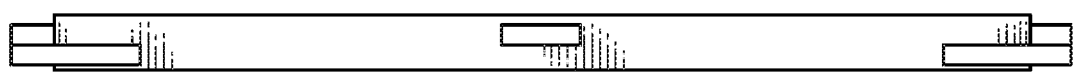
FIG. 23 is a front plan view thereof, the back plan view being a mirror image thereof.
Figure 24:
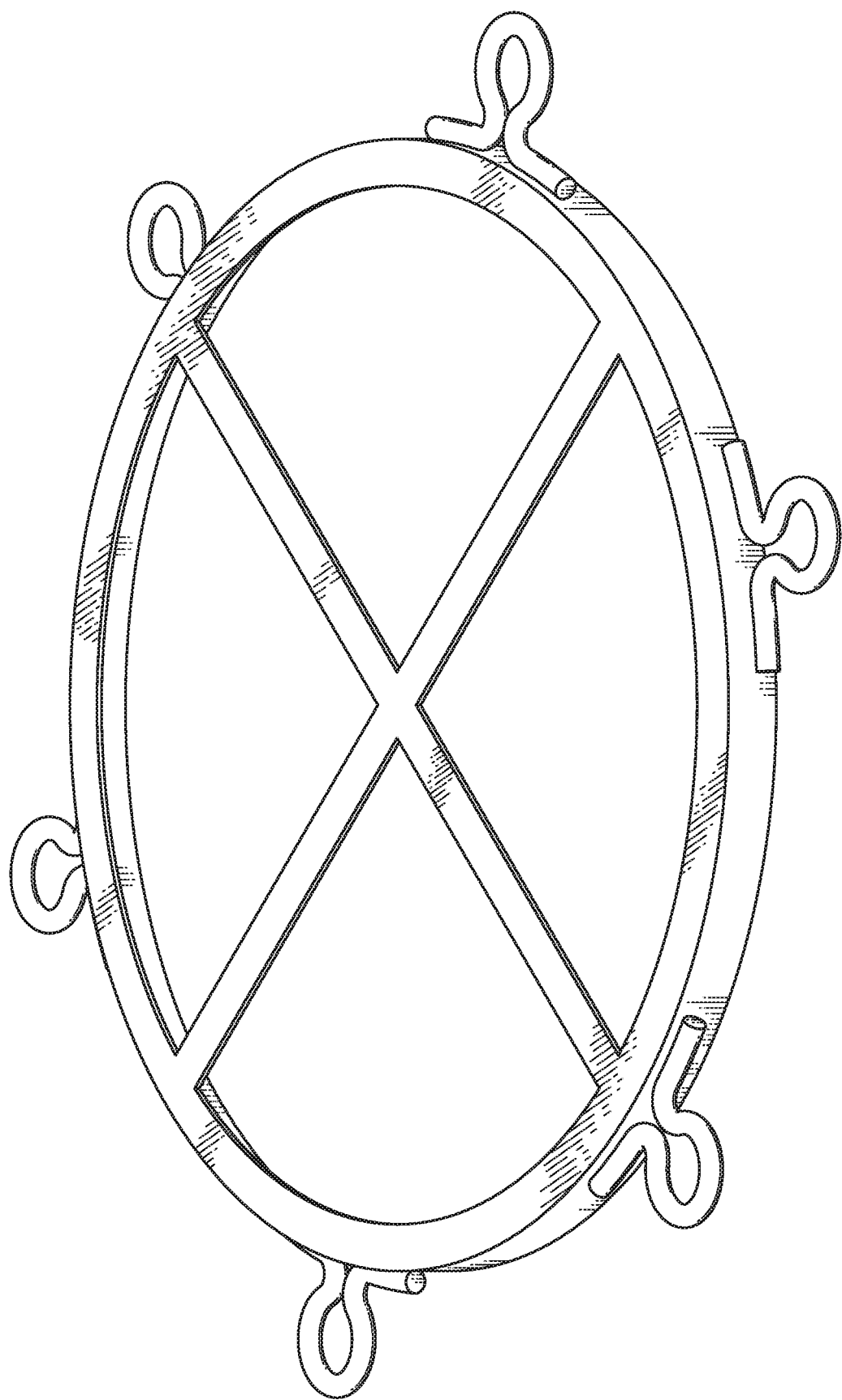
FIG. 24 is a top, front, left side perspective view of a barrel tie-down bracket according to an alternate embodiment having alternately shaped couplings.
Figure 25:
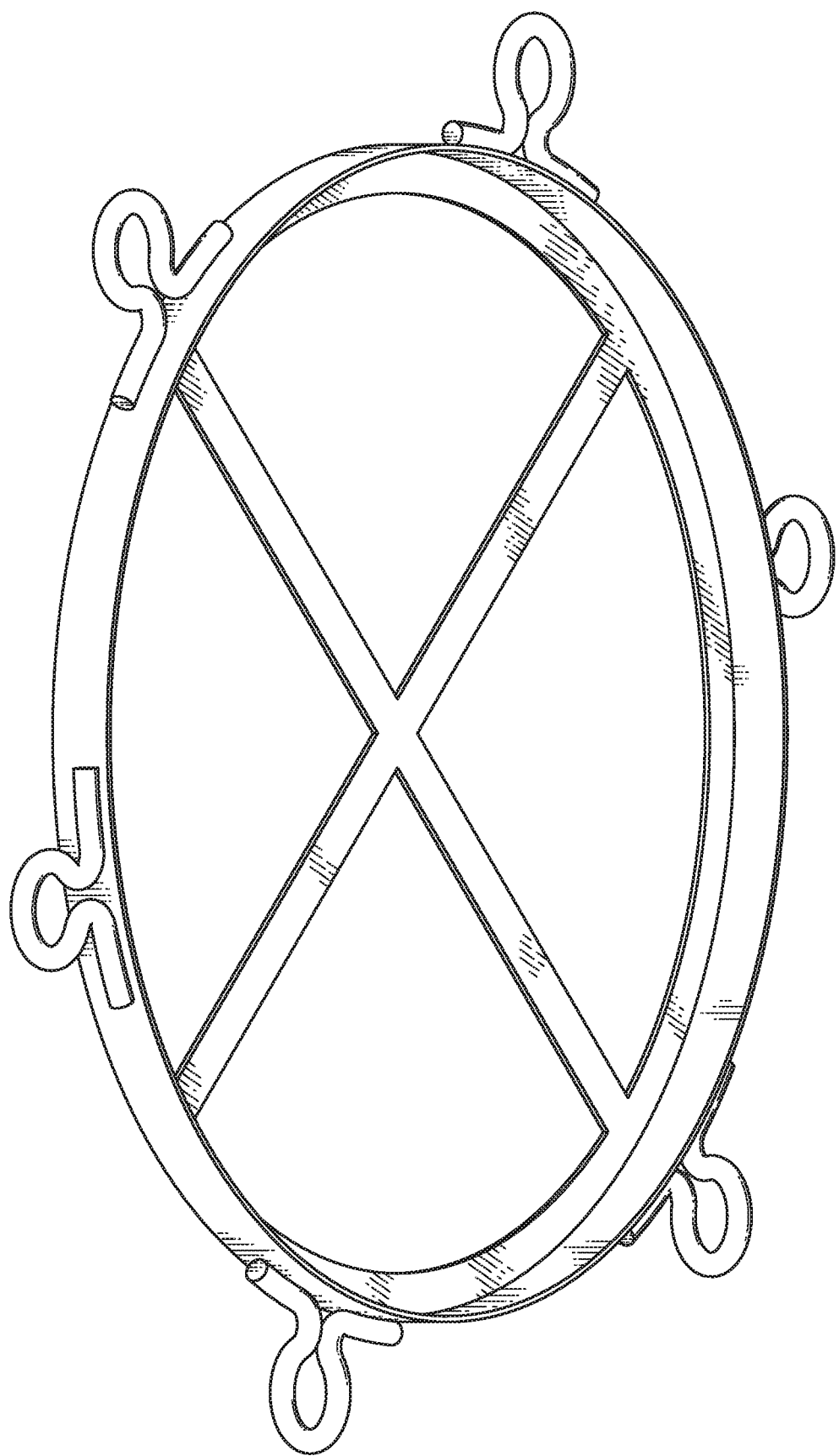
FIG. 25 is a bottom, back, right side perspective view thereof.
Figure 26:
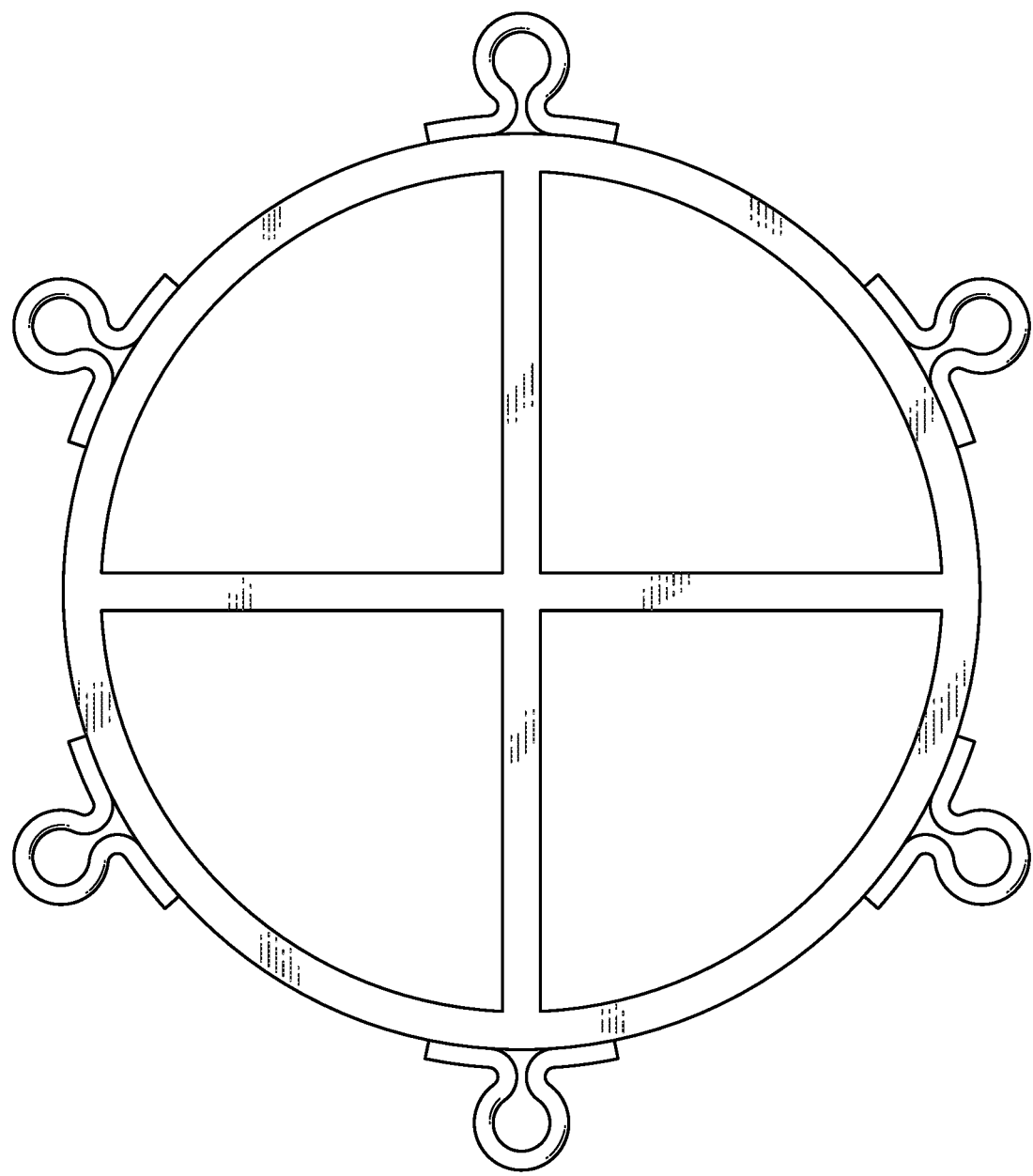
FIG. 26 is a top plan view thereof.
Figure 27:
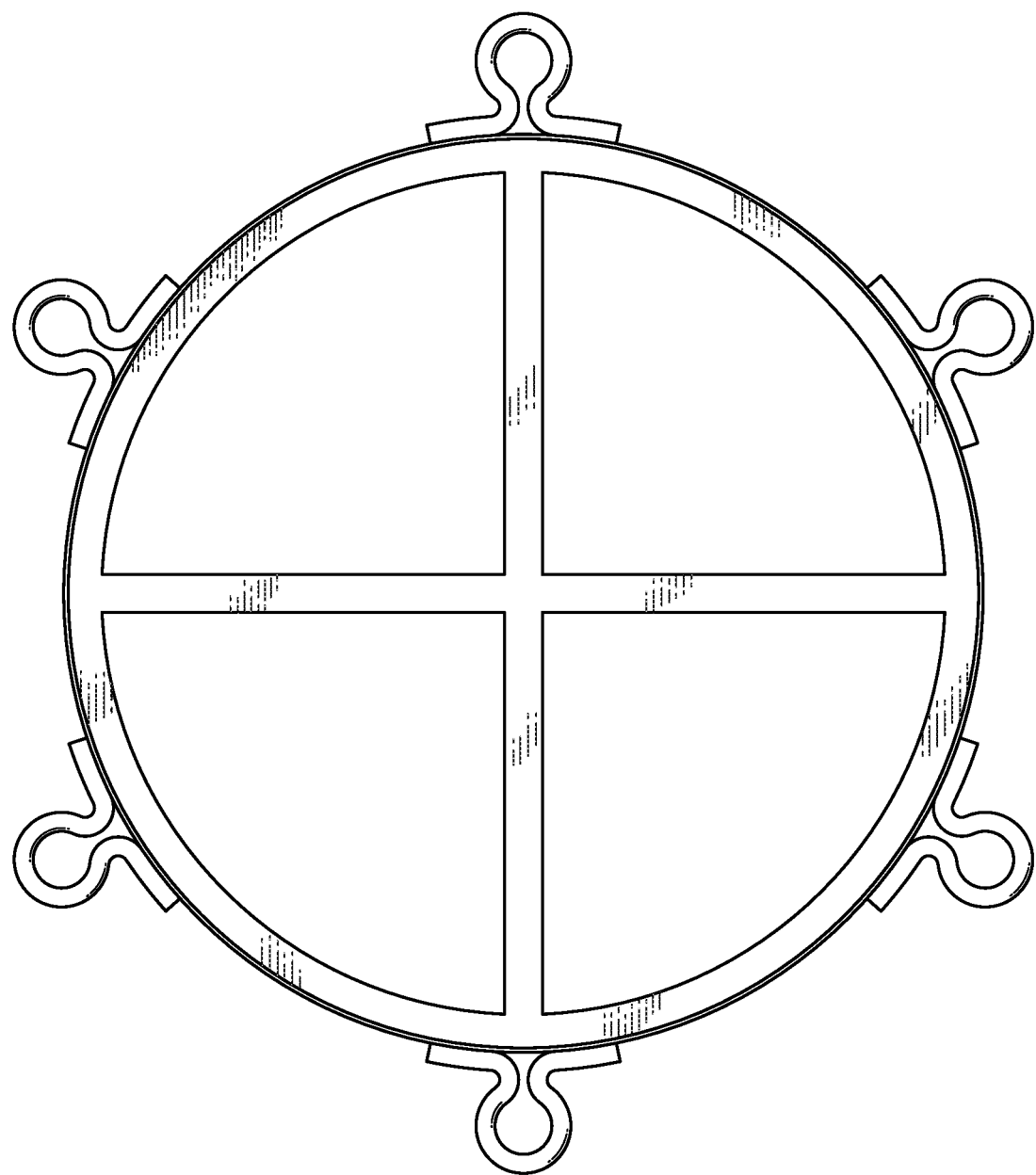
FIG. 27 is a bottom plan view thereof.
Figure 28:
FIG. 28 is a right side plan view thereof, the left side plan view being a mirror image thereof.
Figure 29:
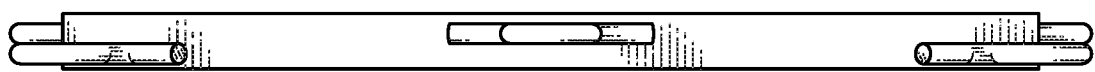
FIG. 29 is a front plan view thereof, the back plan view being a mirror image thereof.

FIG. 17 shows that a coupling 160 can have a plate portion 161 that is spaced a distance D below the upper surface of the hook structure 162 with respect to the embodiment of FIG. 16 so that the FIG. 17 coupling is axially located to overlap a neighboring FIG. 16 coupling when a pair of brackets are coplanarly adjacent.

FIG. 17 further shows an alternate embodiment of the hook structure 162 which can be formed to include a friction clip 164 that bears against the undersurface 165 of the ring-shaped body of the bracket. In this way the coupling can secure to the ring-shaped body by friction alone. Further, the angular position of the coupling is not discrete but rather can be adjusted in an infinite number of angular locations.

FIGS. 18-23 show barrel tie-down bracket of FIG. 2 in various other views.

FIGS. 24-29 show the various views of an alternate embodiment of a barrel tie-down bracket having each coupling formed by a loop of oblong bar material and shaped to have a substantially Greek letter omega shape where the open feet are connected to the sidewall.

It shall be understood that the barrel tie-down bracket can be used for many types of substantially similarly shaped containers having predictable geometry ends, and which can be arranged so that those ends are co-planarly adjacent. Indeed, it shall be understood that only a section of the geometry needs to be uniform so long as that section is the one engaged by the bracket and that those sections are co-planarly adjacent so that the couplings can be co-oriented for interconnection so that the containers can be securely conjoined. For arrays of containers that are uniformly shaped, brackets can be manufactured in a more uniform manner. An advantage of the disclosed bracket system for substantially cylindrical containers such as barrels, including standard oil drums, having axially staggered couplings is that each bracket can be manufactured identically thus avoiding costly changes in molding.

Although the above utilitarian aspects have been described in connection with the operation of an array of oil drums, it shall be understood that the above system can be adapted to many other containers having similar geometries to one another.

While the preferred embodiments of the invention have been described, modifications can be made and other embodiments may be devised without departing from the spirit of the invention and the scope of the appended claims.

What is claimed is:

1. A device for securing a pair of containers having a substantially uniform geometry to one another, said device comprises:
 first and second substantially co-planarly adjacent brackets;
 wherein each of said brackets comprises:
  a body portion shaped and dimensioned to intimately and releasably nest over a section of said uniform geometry;
  said body portion having a periphery;
  a plural number of couplings located at angularly spaced apart locations on the periphery;
  wherein one of a first set of said couplings on said first bracket is shaped and dimensioned to interconnect with a co-oriented one of a second set of said couplings on said second bracket;
 wherein said plural number of couplings are movably secured to said body portion;
 wherein said plural number of couplings are said body portion; and,
 wherein at least one of said plural number of couplings comprises:
  a plate having a distal aperture;
  a hook connected to said plate;
  wherein said hook is shaped and dimensioned to releasably engage said body portion.

2. The device of claim 1, wherein said body portion comprises a plurality of angularly spaced apart seats, wherein each of said seats forms a discrete mounting location for one of said plural number of couplings.

3. The device of claim 2, wherein each of said seats comprises a notch formed on an edge of said body portion, and where said one of said plural number of couplings comprises a nib oriented to engage said notch when said coupling is secured to said body portion.

4. The device of claim 1, wherein said section of said uniform geometry is co-planar when said pair of containers is arranged in a co-planarly adjacent manner.

5. The device of claim 4, wherein said section of said uniform geometry is a circular top end of said container.

6. The device of claim 1, wherein said plural number is six.

7. The device of claim 1, wherein said one of a first set of said couplings on said first bracket is an upper coupling axially spaced apart from said one of a second set of said couplings on said second bracket wherein said one of a second set of said couplings is a lower coupling.

8. The device of claim 7, wherein said upper coupling is axially located to overlap said lower coupling when said first and second brackets are coplanarly adjacent.

9. The device of claim 7, wherein said upper coupling is shaped to have an axial upper aperture, and said lower coupling is shaped to have an axial lower aperture; and wherein said upper aperture and said lower aperture can be engaged by a fastener restricting radial movement between said first and second brackets when said first and second brackets are coplanarly adjacent.

\* \* \* \* \*